(12) United States Patent
Shibaoka et al.

(10) Patent No.: US 7,452,021 B2
(45) Date of Patent: Nov. 18, 2008

(54) TRACTOR

(75) Inventors: Junko Shibaoka, Osaka (JP); Kunihiko Matsumoto, Osaka (JP); Toshikazu Matsubayashi, Osaka (JP); Naoki Yamamoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 11/877,449

(22) Filed: Oct. 23, 2007

(65) Prior Publication Data

US 2008/0084081 A1  Apr. 10, 2008

Related U.S. Application Data

(63) Continuation of application No. 11/816,700, filed as application No. PCT/JP2006/325778 on Dec. 25, 2006.

(30) Foreign Application Priority Data

| Dec. 28, 2005 | (JP) | .............. 2005-378667 |
| Feb. 22, 2006 | (JP) | .............. 2006-045397 |
| Aug. 29, 2006 | (JP) | .............. 2006-232729 |

(51) Int. Cl.
 *B60N 3/02* (2006.01)
(52) U.S. Cl. ...................................... 296/71
(58) Field of Classification Search ............. 296/71, 296/97.7, 1.02; D15/23
 See application file for complete search history.

(56) References Cited

U.S. PATENT DOCUMENTS

| D148,299 S | * | 1/1948 | Hedquist et al. ............. D15/23 |
| 2,669,317 A | * | 2/1954 | Celien ....................... 180/89.1 |
| 2,976,947 A | * | 3/1961 | Cruthis et al. ................ 180/90 |
| D226,557 S | | 3/1973 | Skyer et al. |
| D306,301 S | | 2/1990 | Funabashi et al. |
| D423,520 S | | 4/2000 | Smith |
| D438,546 S | | 3/2001 | Katoh et al. |
| D440,982 S | | 4/2001 | Knight et al. |
| D483,043 S | | 12/2003 | Akashima et al. |
| D537,454 S | * | 2/2007 | Higashikawa et al. ........ D15/23 |
| D547,333 S | | 7/2007 | Nishi et al. |
| D550,251 S | | 9/2007 | Matsumoto et al. |
| 2006/0066129 A1 | * | 3/2006 | Roger ....................... 296/97.7 |

FOREIGN PATENT DOCUMENTS

| JP | 57-48661 | 10/1982 |
| JP | 1-7635 | 3/1989 |
| JP | 6-11897 | 3/1994 |
| JP | H07-34781 | 8/1995 |
| JP | 2000-219065 | 8/2000 |

OTHER PUBLICATIONS

International Search Report for International Appl. No. PCT/JP2006/325778, Japanese Patent Office, mailed on Apr. 10, 2007.
Co-pending U.S. Appl. No. 29/299,859 to Matsumoto et al., filed Jan. 4, 2008.
Co-pending U.S. Appl. No. 29/299,860 to Matsumoto et al., filed Jan. 4, 2008.
Co-pending U.S. Appl. No. 29/303,637 to Matsumoto et al., filed Feb. 13, 2008.

* cited by examiner

*Primary Examiner*—Dennis H Pedder
(74) *Attorney, Agent, or Firm*—Sterne, Kessler, Goldstein & Fox P.L.L.C.

(57) ABSTRACT

An object is to provide an assist grip for an operator to easily ride on/off an operation section. An assist grip for supporting a weight of an operator riding on/off an operation section is disposed in front of a steering wheel so as to overlap steering wheel when viewed in front.

5 Claims, 19 Drawing Sheets

TRACTOR

CROSS-REFERENCE TO RELATED APPLICATIONS

This application is a Continuation of U.S. application Ser. No. 11/816,700, filed Aug. 20, 2007, which is a National Stage of PCT International Appl. No. PCT/JP2006/325778, filed Dec. 25, 2006, the entire disclosures of which are incorporated herein by reference.

TECHNICAL FIELD

The invention relates to an assist grip of a working vehicle, especially, to an assist grip disposed at an operation section of a tractor or the like behind a bonnet.

BACKGROUND ART

As well known from Japanese Utility Model No. H07-34781, in a conventional working vehicle such as a tractor, assist grips are provided on upper portions of rear-wheel fenders so that an operator putting his/her foot on a step can grip either of the assist grips so as to easily ride on/off an operation section of the vehicle while keeping stability of his/her body.

DISCLOSURE OF THE INVENTION

Problem to be Solved by the Invention

Since the conventional assist grips are disposed on lateral opposite sides of an operator's seat in the operation section, an operator sitting on the seat does not have to rise from the seat to naturally grip the assist grip or grips. Thus, the grips can be advantageously adapted to be gripped for safety of the operator when the tractor is unexpectedly unbalanced.

However, while an operator grips an assist grip with his/her one hand during riding on/off the operation section, the operator often grips a steering wheel with the other hand. In this situation, the unfixed steering wheel may rotate by weight or force of the operator applied thereon so as to unexpectedly topple or suddenly twist the operator's body.

Therefore, an object of the invention is to provide an assist grip for an operator to easily ride on/off an operation section.

Means for Solving the Problem

Description of the problem to be solved by the invention is concluded. Means for solving the problem will now be described.

An assist grip for supporting a weight of an operator riding on/off an operation section of a tractor is disposed in front of a steering wheel so as to overlap the steering wheel when viewed in front.

A top of the assist grip is substantially as high as a top of the steering wheel.

The assist grip is attached at opposite base portions thereof onto a top surface of a dashboard.

The assist grip is slant rearwardly upward when viewed in side.

The assist grip is broadened at left and right sides thereof, and is gradually narrowed toward a lateral center portion thereof.

The assist grip is extended laterally so as to stride over an instrument panel.

The assist grip comprises a cored bar and an elastic member peripherally stuck on the cored bar so that both ends of the cored bar project outward from the elastic member so as to be fixed to fixture members provided in a dashboard.

The elastic member of the assist grip has a flanged end.

Effects of the Invention

The invention has the following effects.

An assist grip for supporting a weight of an operator riding on/off an operation section of a tractor is disposed in front of a steering wheel so as to overlap the steering wheel when viewed in front. The present assist grip does not obstruct an operator's forward view. An operator can grip the assist grip disposed in front of the steering wheel, instead of the unstable steering wheel, so as to surely ride on/off the tractor while keeping his/her stable carriage.

A top of the assist grip is substantially as high as a top of the steering wheel, the steering wheel does not inhibit the operator riding on/off from reaching his/her hand toward the assist grip, thereby ensuring his/her stable working carriage.

The assist grip is attached at opposite side base portions thereof onto a top surface of a dashboard, the steering wheel does not inhibit the operator riding on/off from reaching his/her hand toward the assist grip, thereby ensuring his/her stable working carriage. Further, the present assist grip can be easily attached and detached, and can be used as a hunger on which a towel or the like can be hung.

The assist grip is slant rearwardly upward when viewed in side, in comparison with a vertical assist grip when viewed in side, the present assist grip can be easily gripped and can be disposed further close to the operation section. Further, the present assist grip advantageously has a good appearance.

The assist grip is broadened at left and right sides thereof, and is gradually narrowed toward a lateral center portion thereof, the present assist grip has a good appearance, and has increased rigidity at the opposite sides thereof to be gripped so as to stand against a large force.

The assist grip is extended laterally so as to stride over an instrument panel, the present assist grip is prevented from interfering with the instrument panel. Further, the present assist grip can be surely gripped at the lateral opposite sides thereof so that an operator can ride on/off the tractor on either left or right side of the tractor.

The cored bar is fixed at both ends thereof to the fixture members provided in the dashboard, in comparison with an assist grip directly attached to a dashboard, the present assist grip can have a high rigidity and can be firmly fixed so as to further stand against a large force.

The flanged ends made of the elastic member fill up gaps between the assist grip and the dashboard so as to improve the assist grip in appearance.

DESCRIPTION OF NOTATIONS

4 Operation Section
10 Dashboard
11 Steering Wheel
12 Instrument Panel
31 Assist Grip
32 Screw

BEST MODE FOR CARRYING OUT THE INVENTION

An embodiment of the invention will now be described.

Figure 1:
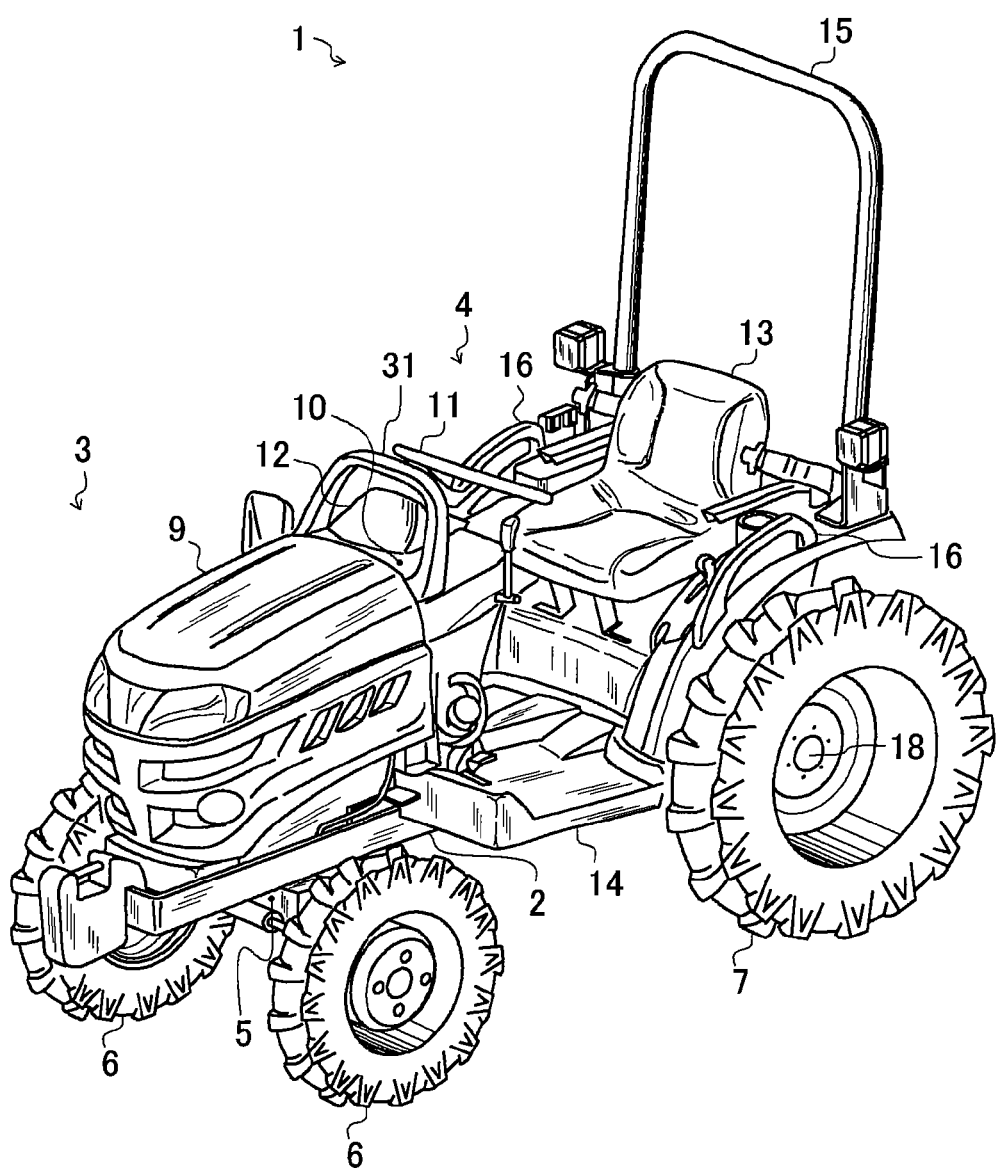
FIG. 1 is a perspective view of an entire structure of a tractor according to an embodiment of the present invention.
Figure 2:
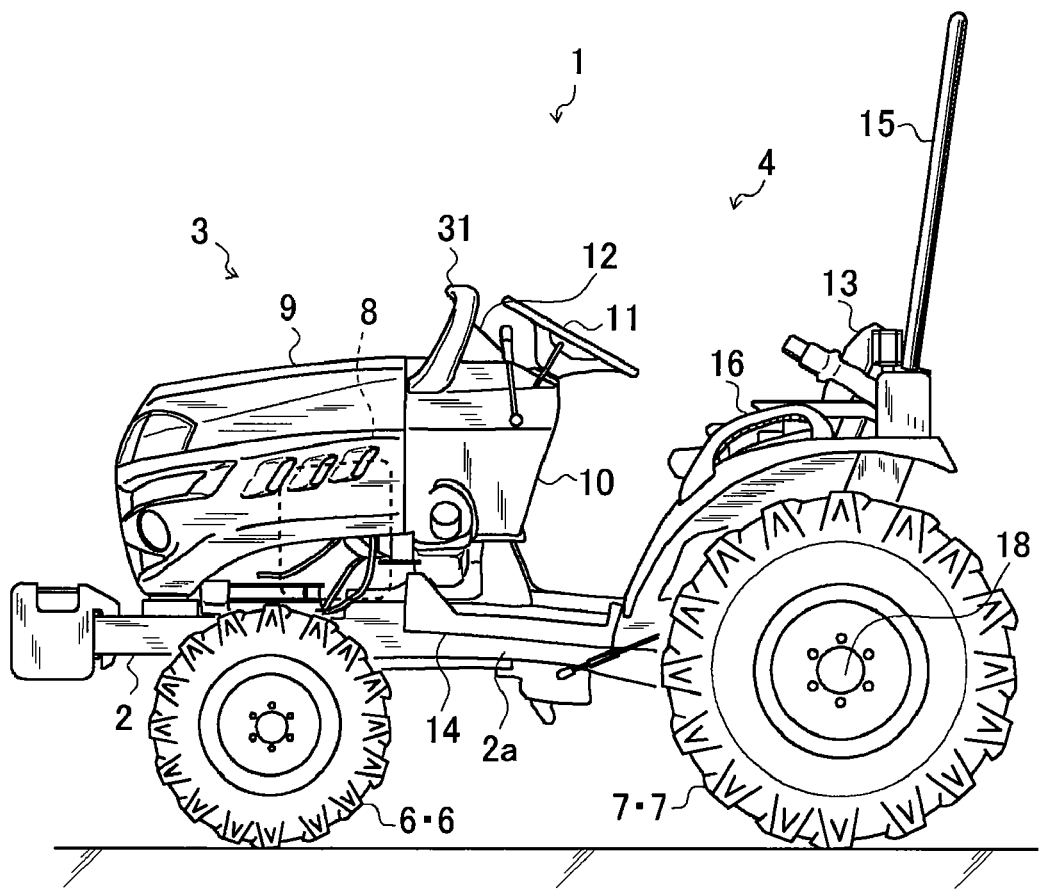
FIG. 2 is a right side view of the tractor shown in FIG. 1.
Figure 3:
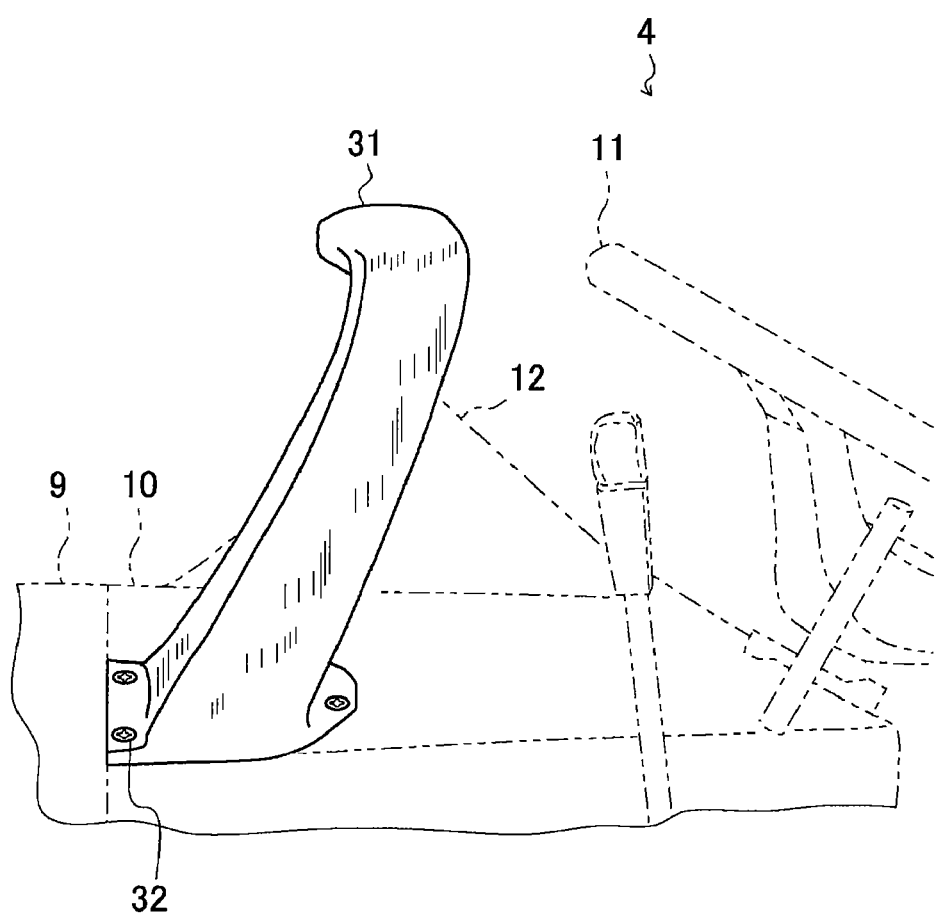
FIG. 3 is a side view of an assist grip of Embodiment 1.
Figure 4:
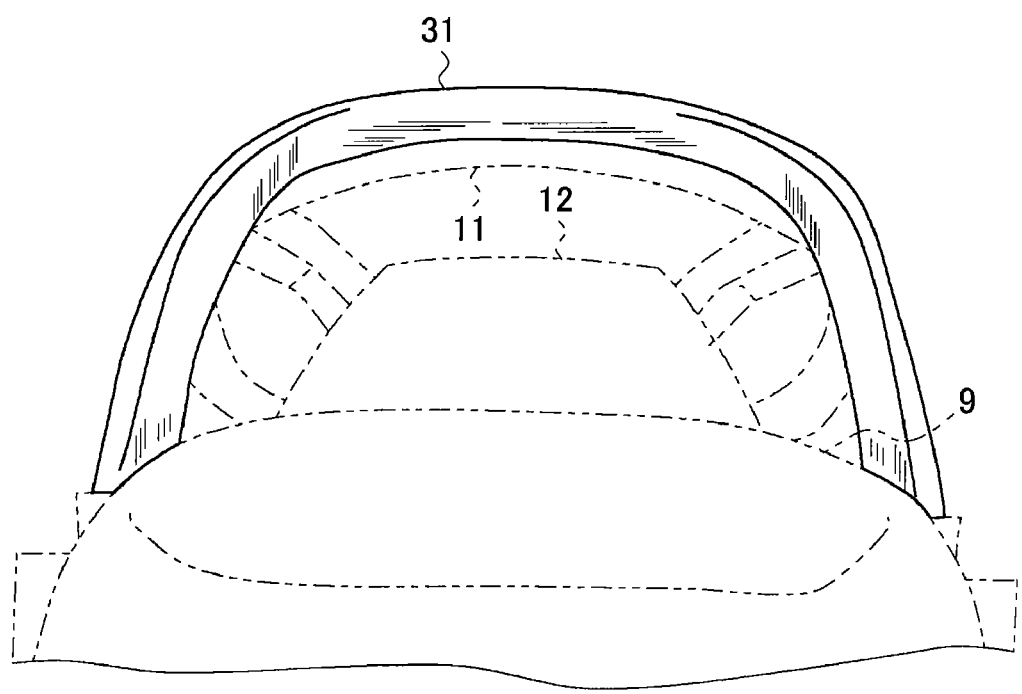
FIG. 4 is a front view of the assist grip of Embodiment 1.
Figure 5:
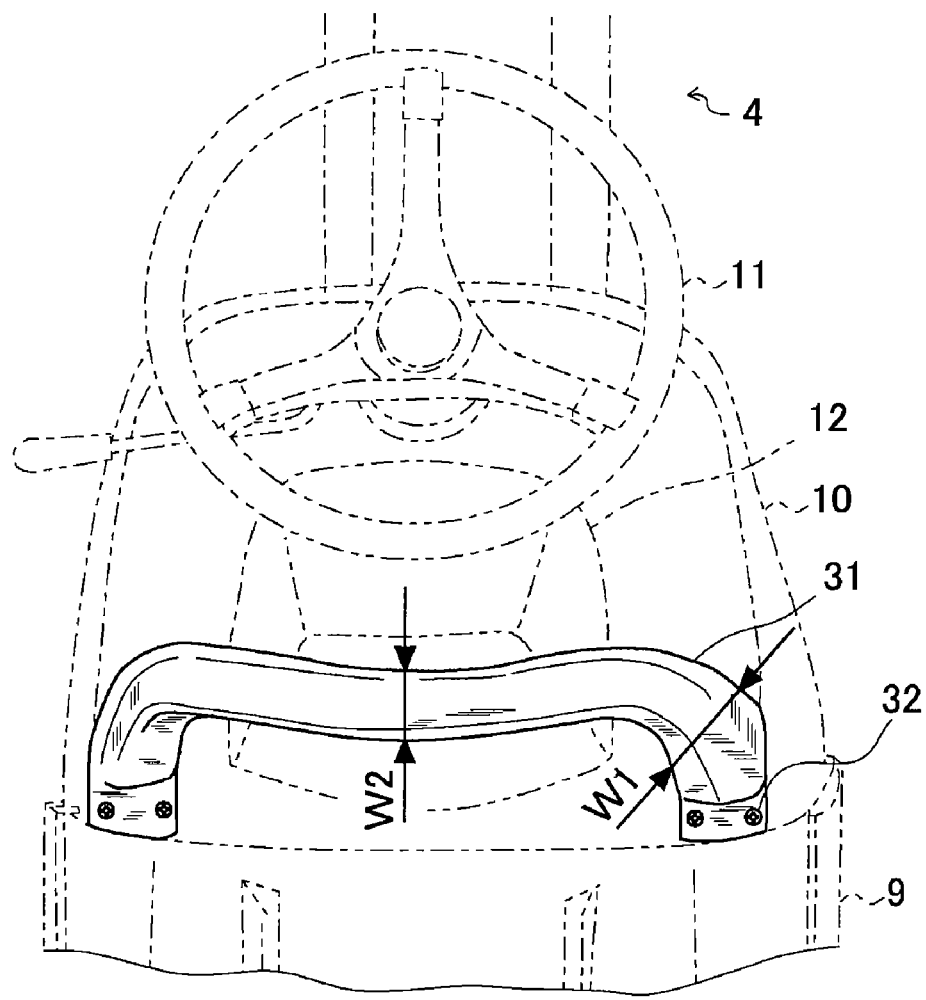
FIG. 5 is a plan view of the assist grip of Embodiment 1.
Figure 6:
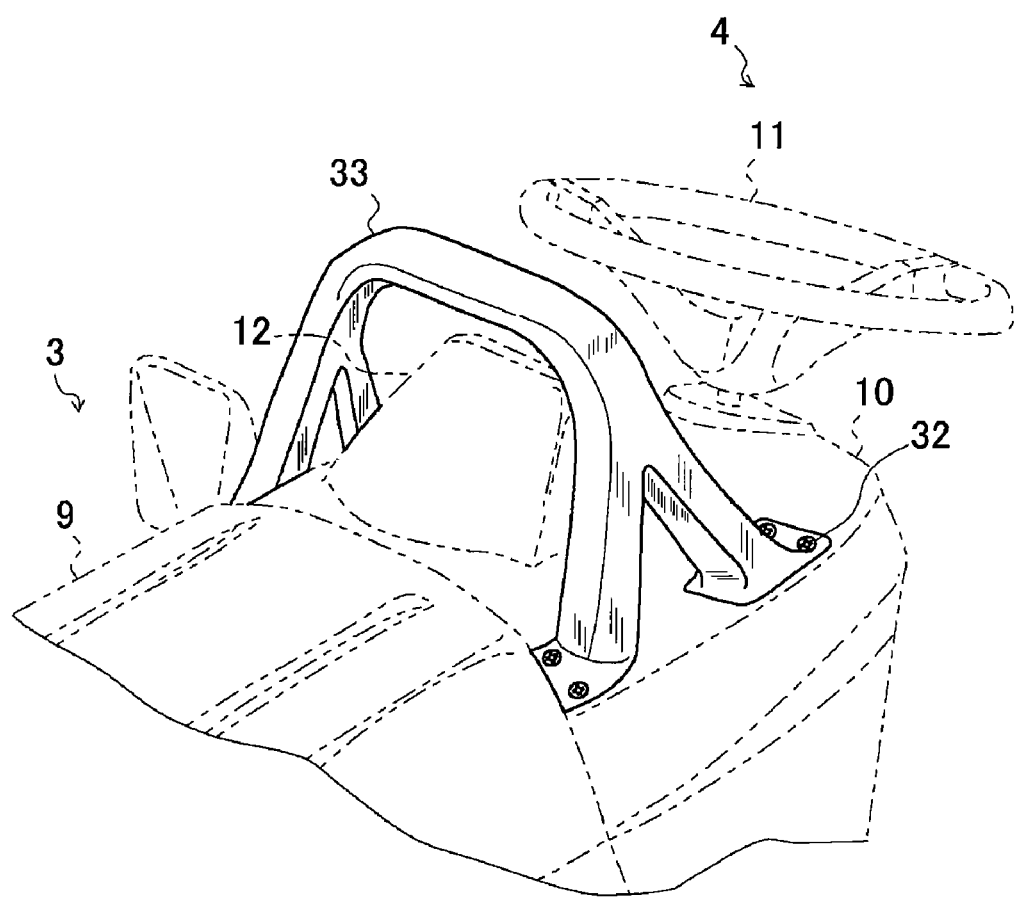
FIG. 6 is a perspective view of an assist grip of Embodiment 2.
Figure 7:
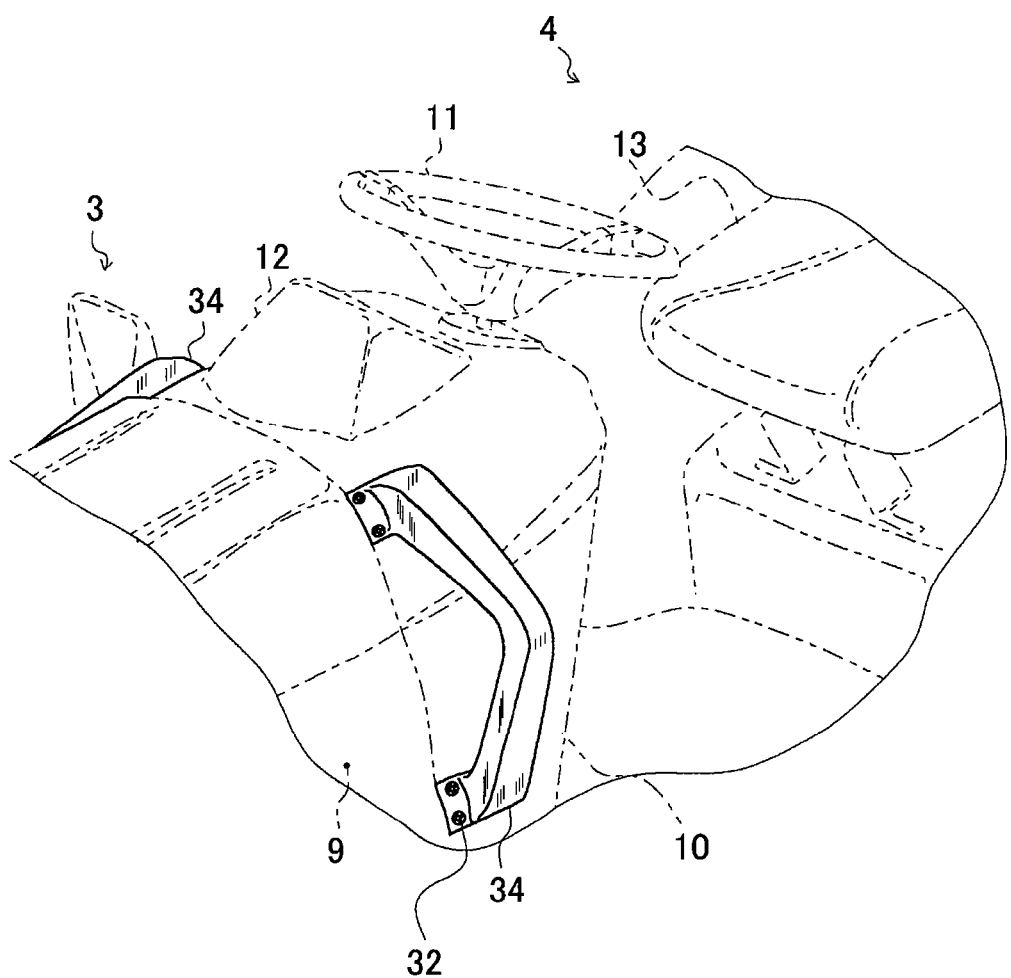
FIG. 7 is a perspective view of an assist grip of Embodiment 3.
Figure 8:
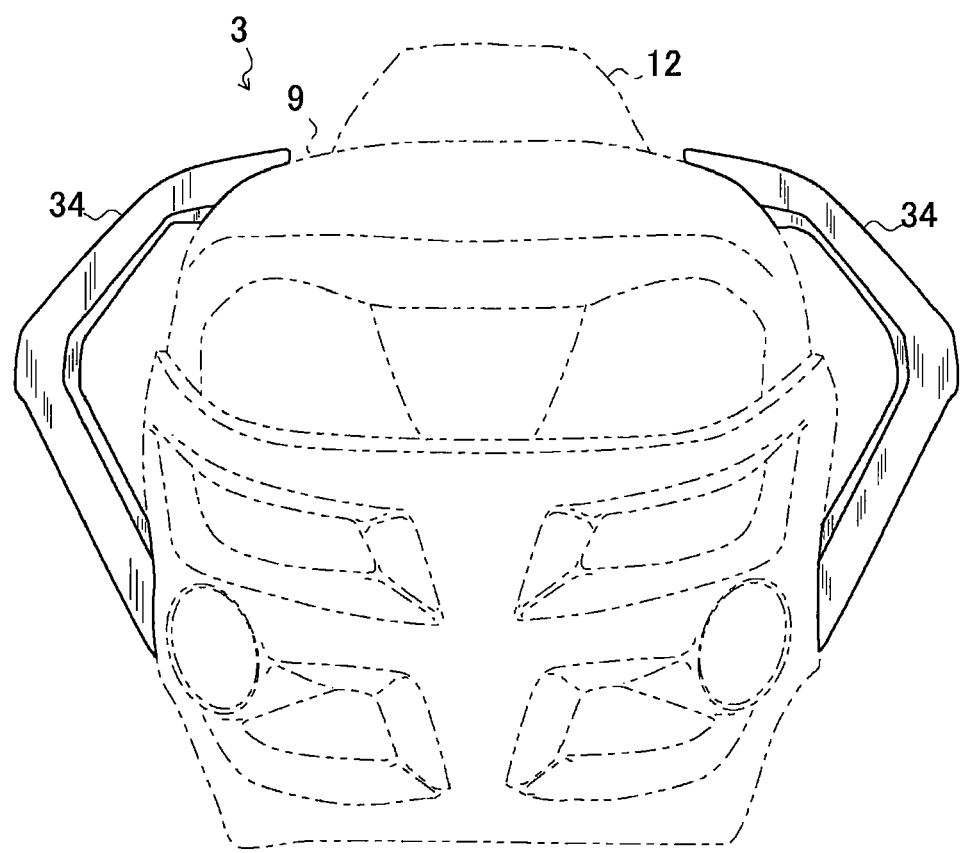
FIG. 8 is a front view of the assist grip of Embodiment 3.
Figure 9:
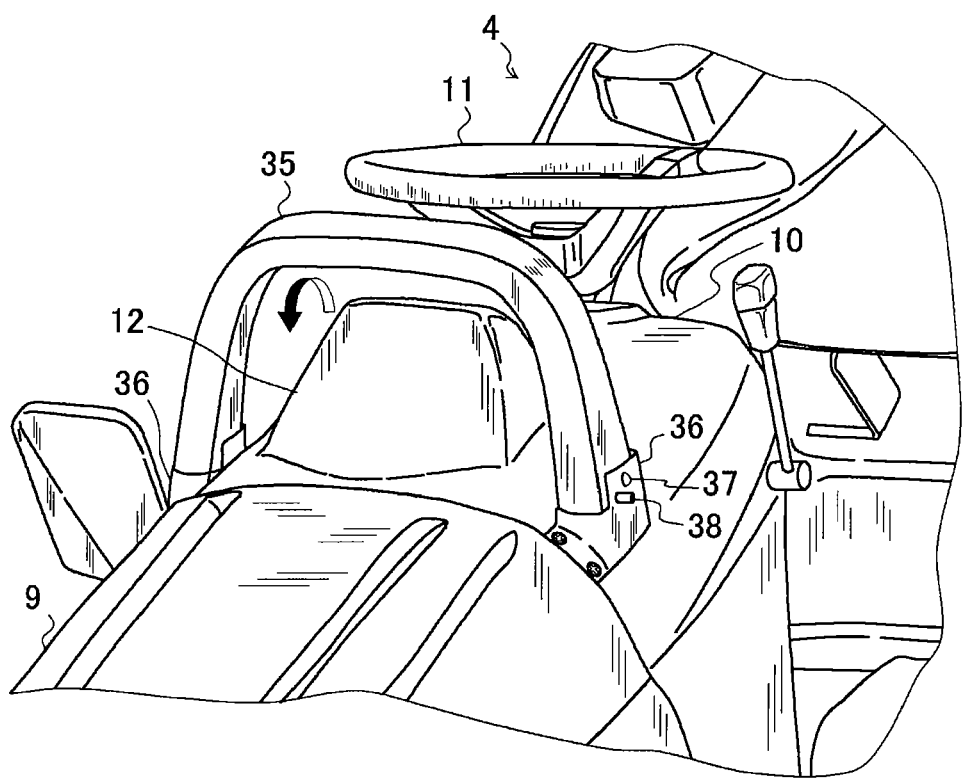
FIG. 9 is a forwardly upward perspective view of an assist grip having a pivot mechanism and its surroundings of Embodiment 4.
Figure 10:
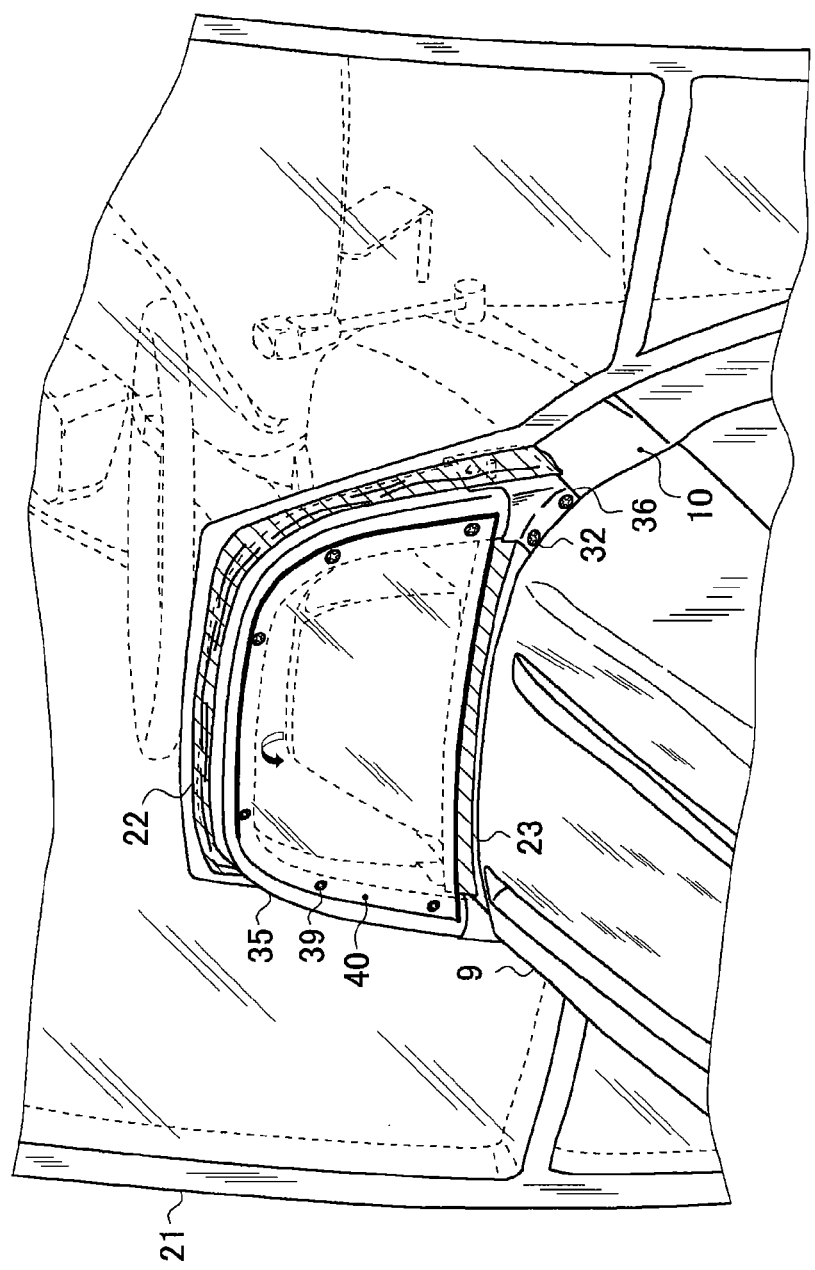
FIG. 10 is a forwardly upward perspective view of an assist grip and its surroundings of a cabined tractor.
Figure 11:
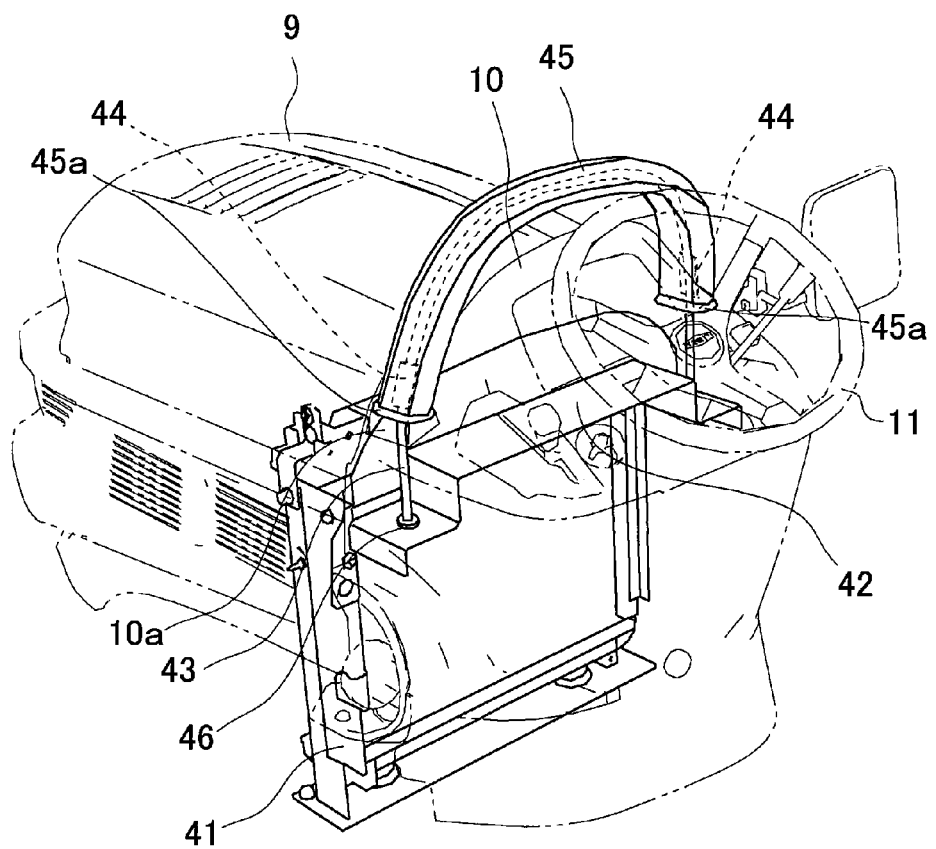
FIG. 11 is a perspective view of an assist grip of Embodiment 5.
Figure 12:
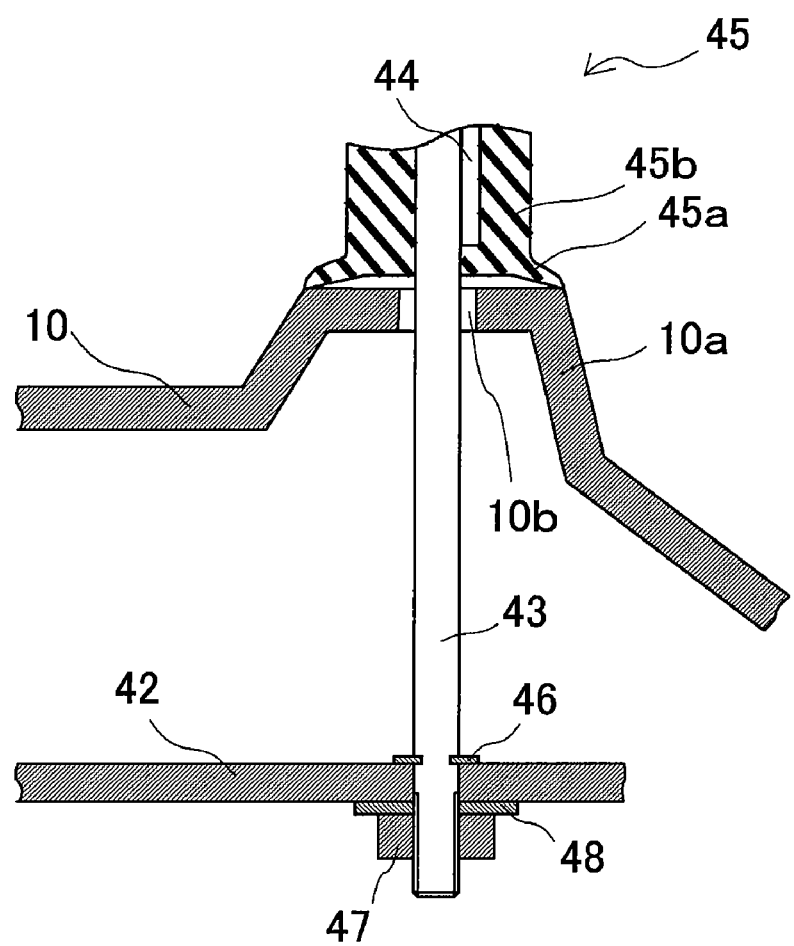
FIG. 12 is a sectional front view of a left joint portion of the assist grip of Embodiment 5.

FIG. 1 is a perspective view of an entire structure of a tractor according to an embodiment of the present invention; FIG. 2 is a right side view of the tractor shown in FIG. 1; FIG. 3 is a side view of an assist grip of Embodiment 1; FIG. 4 is a front view of the assist grip of Embodiment 1; FIG. 5 is a plan view of the assist grip of Embodiment 1; FIG. 6 is a perspective view of an assist grip of Embodiment 2; FIG. 7 is a perspective view of an assist grip of Embodiment 3; FIG. 8 is a front view of the assist grip of Embodiment 3; FIG. 9 is a forwardly upward perspective view of an assist grip having a pivot mechanism and its surroundings of Embodiment 4; FIG. 10 is a forwardly upward perspective view of an assist grip and its surroundings of a cabined tractor; FIG. 11 is a perspective view of an assist grip of Embodiment 5; and FIG. 12 is a sectional front view of a left joint portion of the assist grip of Embodiment 5.

Embodiment 1

<Entire Structure>

Firstly, an entire structure of a tractor 1 will be described with reference to FIGS. 1 and 2.

In tractor 1, an engine section 3 is disposed above a front portion of an engine frame 2, and an operation section 4 is disposed behind engine section 3. A front axle casing 5 is laterally rollably disposed below the front portion of engine frame 2. A pair of front wheels 6 are supported on opposite ends of a front axle (not shown) supported by front axle casing 5. On the other hand, engine frame 2 is formed at a rear portion thereof into a main body frame 2a whose rear portion supports a transmission casing 17 (see FIG. 13). A rear axle 18 is supported by rear axle casings on opposite sides of a rear portion of transmission casing 17, and a pair of rear wheels 7 are supported on opposite ends of rear axle 18.

In engine section 3, an engine 8 is mounted on engine frame 2. Power of engine 8 is transmitted through a transmission in the transmission casing and another power transmission system to front wheels 6, rear wheels 7, a PTO shaft and so on. A bonnet 9 covers engine 8, a radiator, a buttery and so on.

Operation section 4 is disposed above main body frame 2a behind engine section 3, so as to occupy a substantially middle portion and a rear portion in tractor 1.

A dashboard 10 is disposed at a rear portion of bonnet 9 so as to incorporate a fuel tank and so on. A steering wheel 11 is disposed rearwardly upward from dashboard 10 and is fixed on a top of a steering wheel stem. An instrument panel 12, including a tachometer, a fuel gauge, an alarm lamp and so on, is disposed in front of steering wheel 11. An assist grip 13 of the present invention is fixed on an upper front portion of dashboard 10 in front of instrument panel 12. An operator's seat 13 is disposed behind dashboard 10. A pair of assist grips 16 are disposed on lateral opposite sides of seat 13. A step 14 is disposed between bottom portions of seat 13 and dashboard 10, thereby constituting operation section 4 including steering wheel 11 and operator's seat 13.

A safety frame 15 is mounted upright behind seat 13.

<Assist Grip>

Assist grip 31 according to Embodiment 1 of the invention will be described with reference to FIGS. 3 to 5.

Assist grip 31 is an arched single plastic member made of resin material (the same material as that of dashboard 10). Assist grip 31 is disposed on a top surface portion of dashboard 10. In this regard, in front of steering wheel 11, assist grip 31 is detachably fixed at left and right side bottom (base) portions thereof onto lateral opposite front portions of the top surface portion (or onto upper side surface portions) of dashboard 10 (or of a rear portion of the bonnet) through bolts or screws 32 or other members. Assist grip 31 is extended gradually upwardly slantwise (rearwardly upward) from the fixed base portions toward operation section 4. In other words, assist grip 31 is disposed rearwardly upward slantwise above dashboard 10 when viewed in side, and is disposed to overlap steering wheel 11 when viewed in front. To ensure a good appearance without malaise, the slant angle of assist grip 31 corresponds to the slant angle of a top cover of instrument panel 12. In this way, an operator can easily grip the side portion of assist grip 31 disposed in front of steering wheel 11 when the operator rides onto operation section 4 leftward or rightward.

Assist grip 31 reaches at upper side portions thereof to a height that is substantially equal to a height of the top of steering wheel 11. Further, assist grip 31 is extended gradually upward from the left and right sides thereof toward a lateral center portion thereof, so as to be formed without a joint into a substantially vertically reversed U-shape when viewed in front. In other words, the top of assist grip 31 is disposed substantially forward from the top of steering wheel 11. In this way, assist grip 31 is disposed at the lateral center portion thereof higher than the top of steering wheel 11. Further, a lateral width of assist grip 31 is larger than a lateral width of steering wheel 11, and is as large as or smaller than a lateral width of dashboard 10. Therefore, assist grip 31 can be gripped by a hand extended downward or sideward. Further, assist grip 31 and safety frame 15 ensure a safe space for the operator therebetween.

Assist grip 31 is extended laterally so as to stride over instrument panel 12, so that, as shown in FIG. 4, a certain gap space is ensured between an inside of assist grip 31 and an outer periphery of instrument panel 12. Operator's fingers can be inserted into the gap space so as to surely grip assist grip 31.

Further, when viewed in plan, assist grip 31 is formed at an upper portion thereof into an arch-shape, and is disposed at the upper portion thereof in a concentric ring arrangement with steering wheel 11, so as to space assist grip 31 from steering wheel 11. Therefore, assist grip 31 is prevented from obstructing operation of steering wheel 11, and is adapted to be easily gripped at the upper portion thereof by a hand extended downward.

Assist grip 31 has a substantially rectangular sectional shape, basically curved without a sharp corner. This sectional shape of assist grip 31 is not to be limitative. For example, the sectional shape of assist grip 31 may be circle, polygon, or another unique shape in consideration of rigidity of the component member and facility for gripping. However, with respect to thickness of the component member of assist grip 31, the structure of the present embodiment is further advantageous, that is, the horizontal extended portion (W2 shown in FIG. 5) in a front view is narrower than the upward extend portions (W1 shown in FIG. 5). In other words, assist grip 31 is broadened at the left and right sides thereof and is gradually narrowed toward the lateral center portion thereof. Due to this structure, the upward extended portions have sufficient strengths, and the horizontal extended portion in a front view is adapted to be easily gripped.

In the present embodiment, resin serves as material of assist grip 31, however, this is not limitative of material of assist grip 31. Alternatively, it may be made of metal material. Further, in the present embodiment, only the single member is made into assist grip 31, however, this is not limitative. Alternatively, for example, left and right side parts and a horizontal part may be separate so as to be easily assembled together to constitute assist grip 31. Assist grip 31 can be easily detachably fastened to dashboard 10 through screws 32 or other fastening means without an exclusive tool. Assist grip 31 can be easily removed if it is not required. Alternatively, assist grip 31 may be formed integrally with dashboard 10.

Embodiment 2

An assist grip 33 according to Embodiment 2 of the present invention will now be described with reference to FIG. 6.

In comparison with the assist grip of Embodiment 1, assist grip 33 of Embodiment 2 is similarly arch-shaped when viewed in front, however, it is different when viewed in side. In this regard, assist grip 33 of Embodiment 2 is bifurcated downward when viewed in side. More specifically, front and rear bottom ends of each base portion of assist grip 33 are fixed onto each of left and right top surfaces of dashboard 10 through screws 32 or the like, and are extended upward slantwise so as to be joined to each other, that is, to be substantially vertically reversed Y-shaped when viewed in side. Assist grip 33 has the left and right upper side portions extended gradually to a lateral center portion so as to be connected to each other without a joint.

Due to the shape according to Embodiment 2, assist grip 33 is firmly fixed to dashboard 10 so as to increase its rigidity. An operator can selectively grip either of the front and rear downward extended portions easily depending on his/her physical features. Further, the operator can ride on/off the tractor while keeping his/her stable attitude, for example, he/she grips the front downward extended portion for riding on, and grips the rear downward extended portion for riding off. Similar to that of Embodiment 2, assist grip 33 can be easily attached or detached to and from dashboard 10 by screwing screws 32 or by using other fastening means without an exclusive tool.

Embodiment 3

An assist grip 34 according to Embodiment 3 of the present invention will now be described with reference to FIGS. 7 and 8.

Left and right members serving as respective assist grips 34 are fixed on left and right side surfaces of dashboard 10. Assist grips 34 are laterally symmetric. Thus, only representative left assist grip 34 when viewing forward in the traveling direction will be described as follows.

Assist grip 34 is substantially doglegged when viewed in front. Upper and lower fixture base portions of assist grip 34 are fixed onto a forward portion of the side surface of dashboard 10. Assist grips 34 are disposed at lateral distal ends thereof within a tread of the tractor.

According to Embodiment 3, assist grips 34 on the left and right side surfaces of dashboard 10 ensure a wider operator's view in operation section 4 than that according to Embodiment 1 or 2. The assist grip can be gripped at the best position to be easily gripped regardless of whether the tractor is long or short. Further, assist grip 34 has a portion, which is not extended vertically but is distally downward slantwise, so as to be easily gripped by an operator riding off the tractor. Similar to those of Embodiments 2 and 3, assist grips 34 can be easily attached or detached to and from dashboard 10 by screwing screws 32 or by using other fastening means without an exclusive tool.

Embodiment 4

<Assist Grip>

An assist grip 35 according to Embodiment 4 of the present invention will now be described with reference to FIGS. 9 and 8.

In comparison with the assist grip of Embodiment 1, assist grip 35 of Embodiment 4 is similarly arch-shaped when viewed in front, however, it is different in arrangement relative to dashboard 10. In this regard, assist grip 35 is rotatable forward in the traveling direction of tractor 1. This structure will be detailed as follows.

Onto left and right forward portions of the top surface or upper side surfaces of dashboard 10 are detachably fastened respective brackets 36 for mounting assist grip 35 through screws 32 or the like.

Assist grip 35 is forwardly or rearwardly rotatably pivoted at base portions thereof onto respective brackets 36 through respective connection pins 37. In the present embodiment, each bracket 36 is formed at a rear upper portion thereof integrally with a stopper, so as to allow only the forward rotation of assist grip 35. A lock pin 38 is provided onto a side surface of each bracket 36 so as to surely hold erected assist grip 35.

Since assist grip 35 is provided with the above-mentioned pivot mechanism, assist grip 35 can be selectively erected or laid depending on situations. Assist grip 35 can be erected only when it is required, e.g., when an operator rides on/off operation section 4. During traveling of tractor 1, assist grip 35 can be laid to ensure a wide view. Similar to those of Embodiments 2 to 4, assist grip 35 can be easily attached or detached to and from dashboard 10 by screwing screws 32 or by using other fastening means without an exclusive tool.

Embodiment 5

<Assist Grip>

An assist grip 45 according to Embodiment 5 of the present invention will now be described with reference to FIGS. 11 and 12.

In comparison with the assist grip of Embodiment 1, assist grip 45 of Embodiment 5 has a similar front shape or appearance, i.e., it is arch-shaped when viewed in front, however, it is different in arrangement relative to dashboard 10. In this regard, assist grip 45 is not directly attached to dashboard 10, however, assist grip 45 is a separate member detachably attached to a stay 42, serving as a fixture member, disposed in dashboard 10, and is extended upward from dashboard 10 through holes 10b opened on dashboard 10. This structure will be detailed as follows.

In a rear portion of bonnet 9, a support frame, i.e., a radiator bracket 41 in this embodiment, is mounted upward from engine frame 2. Stay 42 serving as the fixture member is fixed onto an upper portion of radiator bracket 41 and extended rearward of the tractor. Stay 42 has holes opened at left and right sides thereof so as to have a later-discussed cored bar 43 inserted thereinto.

On the other hand, assist grip 43 of this embodiment is provided at a center axial portion thereof with cored bar 43. An elastic member 45b, made of polyurethane foam material, rubber or other material, is peripherally stuck or wound on cored bar 43 integrally with cored bar 43, so as to be easily gripped and to be little slippery. Cored bar 43 may be fixedly provided on intermediate portions with respective twist-prevention plates 44 so as to be prevented from twisting elastic member 45b.

Cored bar 43 is extended at both ends thereof outward from elastic member 45b so as to have threaded tips to be fixed by nuts 47 or the like. Cored bar 43 is formed thereon above the tips with grooves into which respective retaining rings 46 or the like are engaged. Elastic member 45b has end portions to contact the tip surface of dashboard 10. The end portions of elastic member 45b have respective outer peripheries that are radially larger than a main portion of elastic member 45b and are expanded downward so as to have respective flanged portions 45a. In this regard, flanged portions 45a are plate-like shaped. When assist grip 45 is mounted onto dashboard 10, it may happen a gap between assist grip 45 and dashboard 10 because of dispersion in dimension, however, due to the elasticity of flanged portion 45a, flanged portion 45a fills up the gap so that assist grip 45 can tightly fit at the peripheral ends to dashboard 10, thereby being advantageous in appearance. Further, due to flanged portions 45a, assist grip 45 have areas to be fitted on dashboard 10, and the areas are larger than those of a conventional assist grip, whereby assist grip 45 can be further stably fixed on dashboard 10.

On the other hand, the pair of left and right holes 10b are opened on dashboard 10 so as to pass cored bar 43 therethrough. Bosses 10a are formed around respective holes 10b so as to rise from the top surface of dashboard 10. Bosses 10a are adapted to receive respective flanged portions 45a of assist grip 45 put on upper surfaces thereof.

Due to the above structure, cored bar 43 on the opposite sides of assist grip 45 is passed through holes 10b opened in respective bosses 10a, and through respective holes of stay 42 provided in dashboard 10. Cored bar 43 is provided thereon with retaining rings 46 on the upper portion of stay 42, and is fastened to stay 42 by nuts 47 and washers 48 beneath stay 42, thereby fixing assist grip 45 to dashboard 10. Assist grip 45 mounted as the above has high rigidity in comparison with that directly mounted on dashboard 10. Further, assist grip 45 provided therein integrally with cored bar 43 has high rigidity in comparison with that made of only the resin material. Alternatively, assist grip 45 made of resin material without cored bar 43 may be directly attached to stay 42.

<Cabined Style>

The above embodiments of assist grips have been described based on the un-cabined tractor. Of course, these embodiments are adaptable to a cabined tractor. FIG. 10 illustrates an example of the cabined tractor. The cabin has a front surface 21, whose lower portion is disposed on an upper portion of dashboard 10 and is formed at a lateral middle portion thereof with a considerably large notch along the outline of assist grip 35. A seal 22 made of elastic material such as rubber is stuck onto the circumferential edge of the notch so as to fit along the shape of assist grip 35. On the other hand, a transparent plate 40 is fastened to a front surface of assist grip 35 by screws 39 or the like, so as to cover the gap space between the inside of assist grip 35 and the top surface of dashboard 10. Transparent plate 40 is configured so as to allow the action of the pivot mechanism of assist grip 35. A seal 23 made of elastic material is provided on a lower portion of transparent plate 40 or the top surface of dashboard 10 so as to fill up the gap between transparent plate 40 and the top surface of dashboard 10.

Due to this structure, present assist grip 35 adapted to the un-cabined tractor can be also adapted to the cabined tractor without requiring additional design of the portion around dashboard 10. When assist grip 35 is laid forward, the remaining opening can be used as a small window for ventilating fresh air. When assist grip 35 is erected, seals 22 and 23 perfectly ensure the air-tightness of operation section 4 so as to prevent wind, rainwater and the like from entering operation section 4.

Assist grip 35 of Embodiment 4 is not a limitative assist grip to be adapted to the cabined tractor. Any one of the assist grips of other Embodiments 1 to 3 and 5 can be adapted to the cabined tractor by notching front surface 21 of the cabin along the outline of the assist grip, and by sealing gaps. However, since each of the assist grips of Embodiments 1 to 3 and 5 is provided with no pivot mechanism, an additional small window is required.

<Speed Control System>

Description will now be given of an embodiment of a speed control system for easily reproducing the last set speed in a vehicle equipped with an auto-cruise system.

Figure 13:
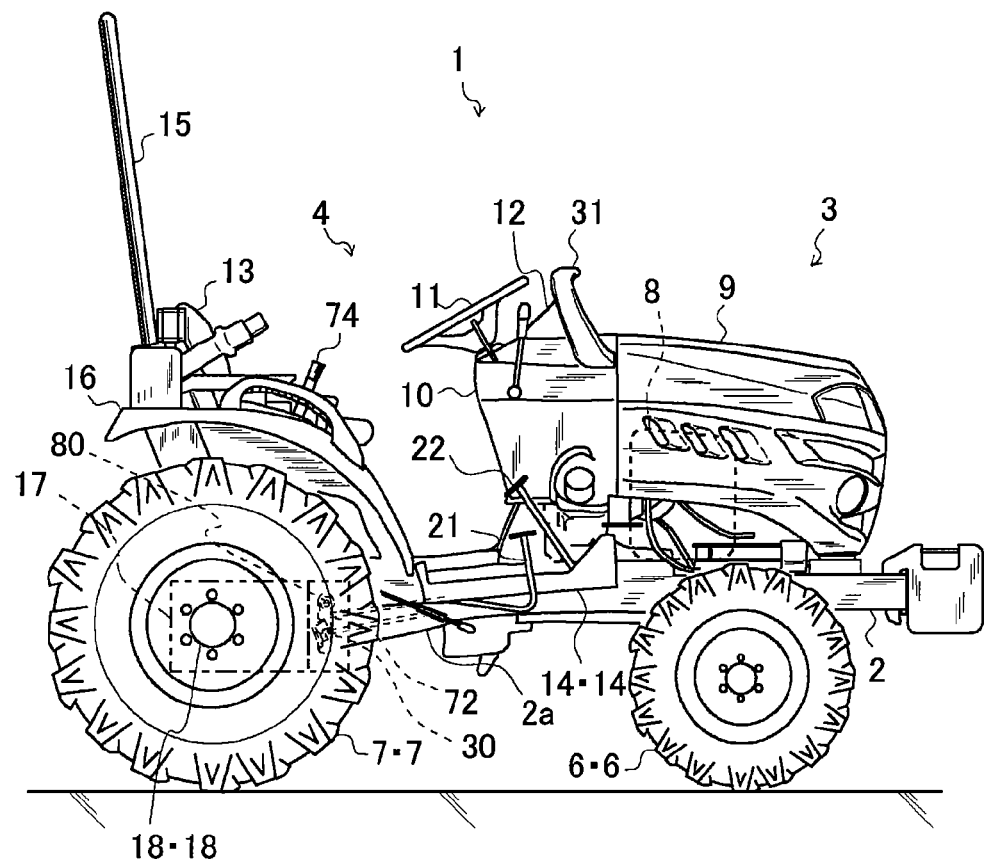
FIG. 13 is a left side view of a tractor equipped with a speed control system.
Figure 14:
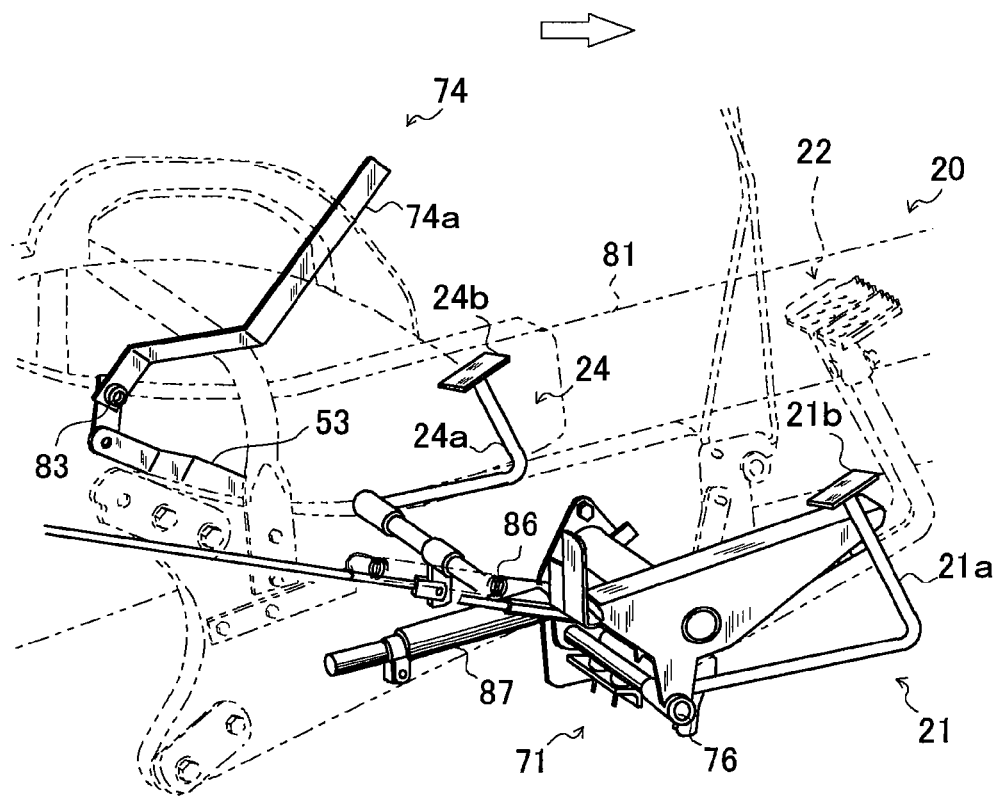
FIG. 14 is a rearwardly upward perspective view of an arrangement of a pedal mechanism constituting the speed control system.
Figure 15:
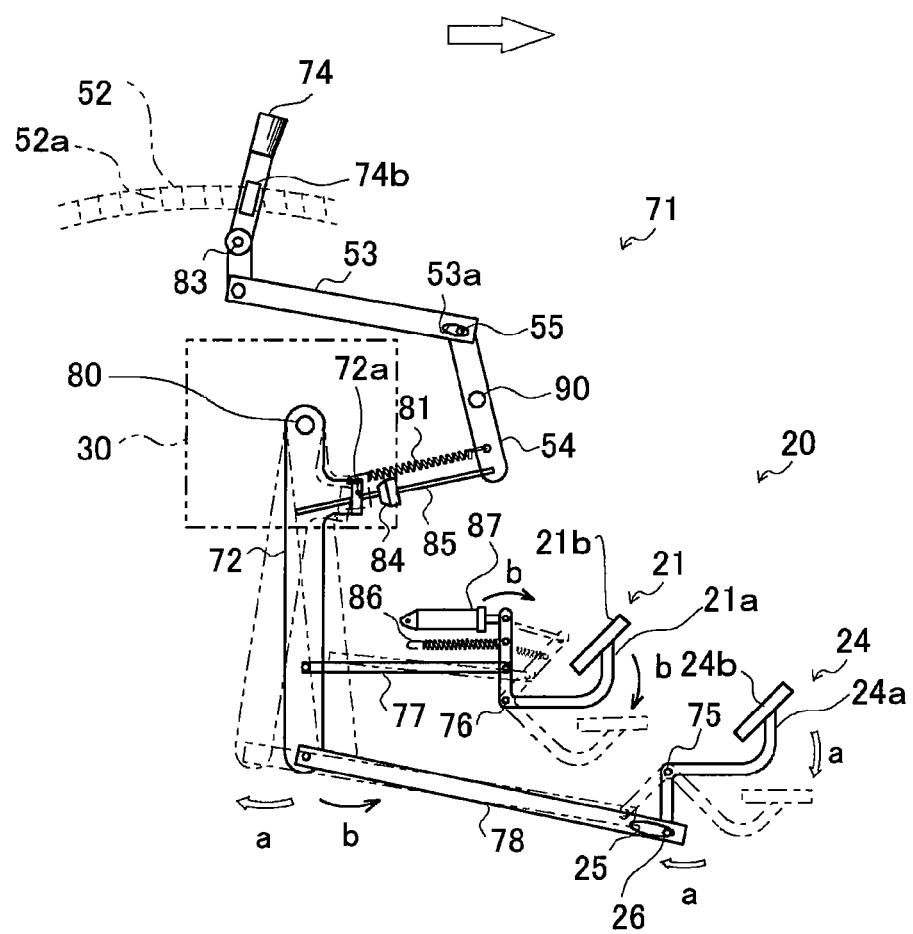
FIG. 15 is a model diagram of a structure of the pedal mechanism.
Figure 16:
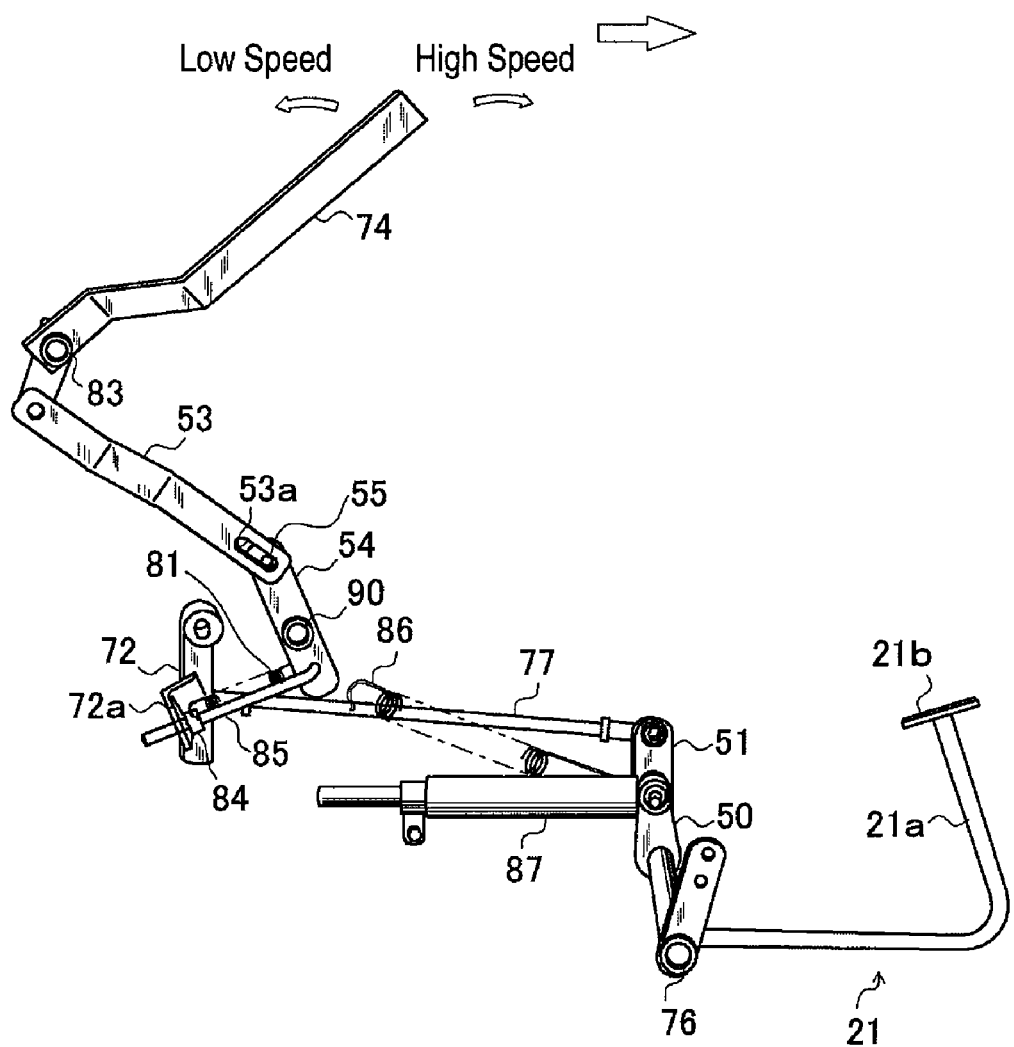
FIG. 16 is a side view of the entire pedal mechanism.
Figure 17:
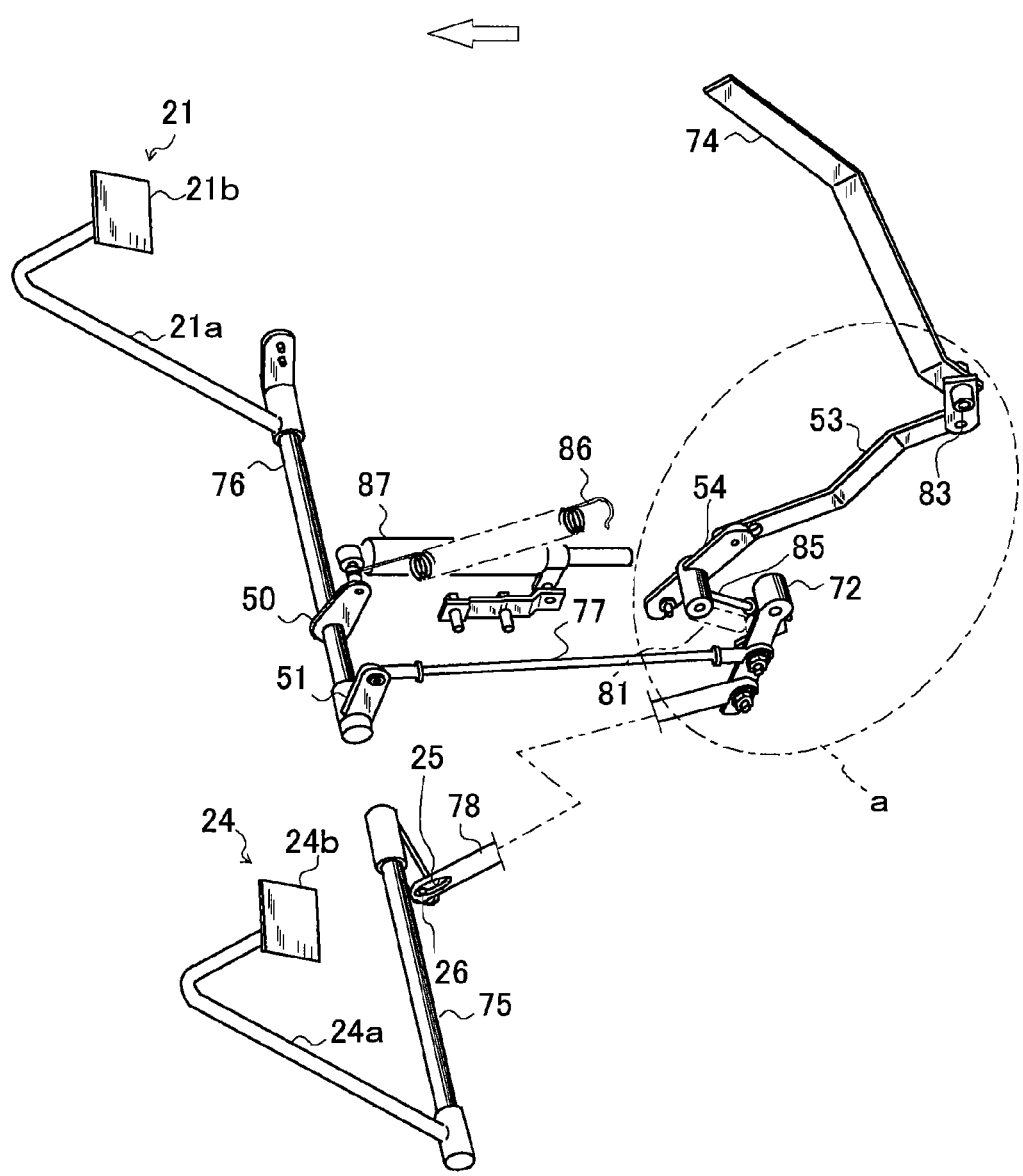
FIG. 17 is a forwardly upward perspective view of the entire pedal mechanism.
Figure 18:
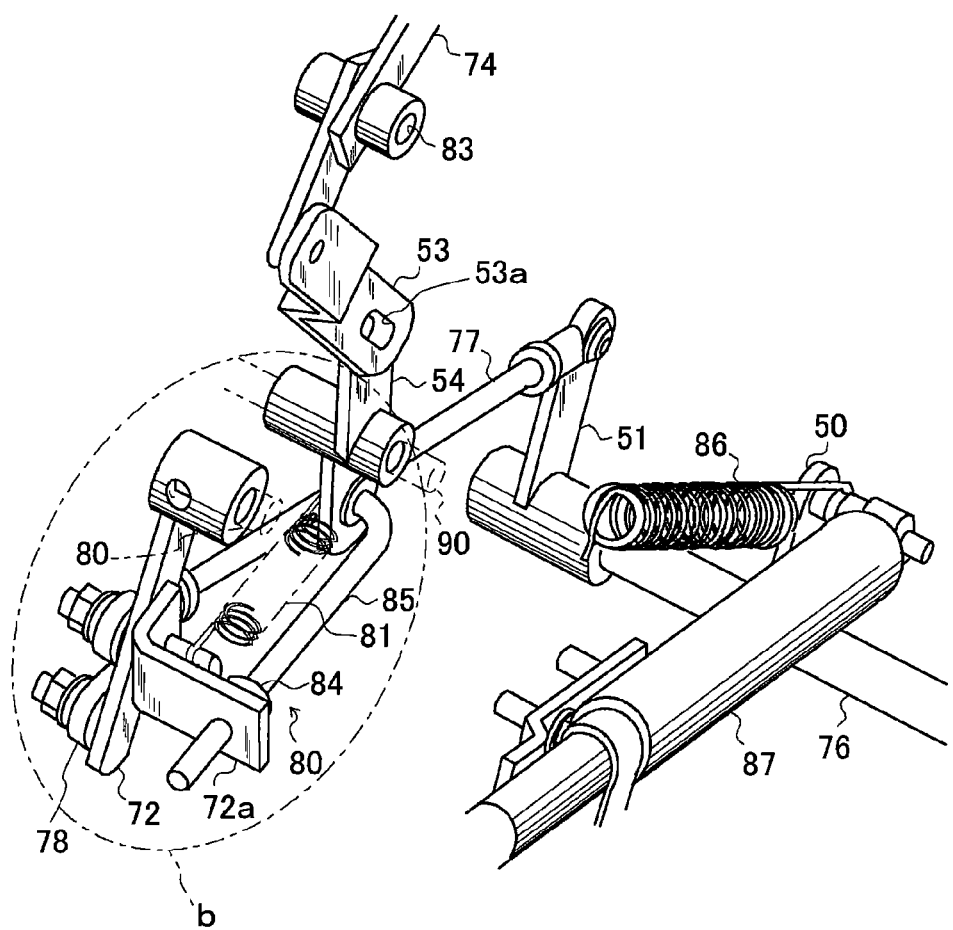
FIG. 18 is a detailed rearwardly upward perspective view of a portion "a" in FIG. 17.
Figure 19:
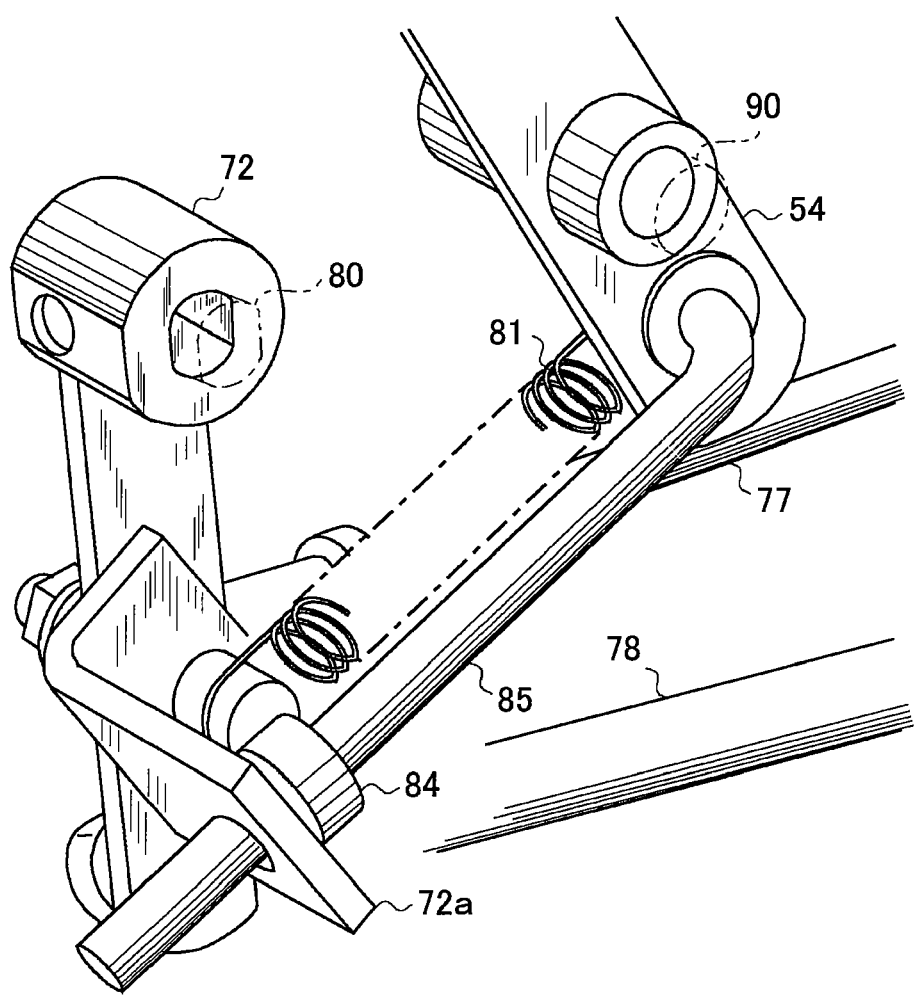
FIG. 19 is a detailed rearwardly upward perspective view of a portion "b" in FIG. 18.

FIG. 13 is a right side view of a tractor equipped with a speed control system; FIG. 14 is a rearwardly upward perspective view of an arrangement of a pedal mechanism constituting the speed control system; FIG. 15 is a model diagram of a structure of the pedal mechanism; FIG. 16 is a side view of the entire pedal mechanism; FIG. 17 is a forwardly upward perspective view of the entire pedal mechanism; FIG. 18 is a detailed rearwardly upward perspective view of a portion "a" in FIG. 17; and FIG. 19 is a detailed rearwardly upward perspective view of a portion "b" in FIG. 18.

Conventionally, there is a well-known vehicle provided with a cruise-control system having a hydrostatic stepless transmission (HST) or hydro-mechanical stepless transmission (HMT) for keeping a constant traveling speed (as disclosed in JP 2000-219065 A). The cruise-control system is configured so that, when the traveling speed changed by operating an accelerator pedal (or a speed control pedal) reaches a target speed, a speed-setting lever is operated so as to keep the speed, and that, when a brake pedal or clutch pedal is operated, the cruise-control is canceled.

However, at agricultural work, such as cultivation, planting or harvest, when the vehicle turns on a field end, when the vehicle is supplemented with seedlings during its straight traveling, when the vehicle stops the work because of an obstacle, or for another reason, the cruise-control is canceled. When the work is resumed, the renewal set speed may disagree with the last set speed, i.e., a slight difference of speed may occur to cause uneven work results. There is a technology of reproducing a traveling speed with a speed sensor or the like, however, this cruise-control system is complicated.

The present speed control system shown in FIGS. 13 to 19 is a simple system which can easily reproduce a set speed so as to solve the above problem.

The present speed control system is provided for a vehicle equipped with a continuously variable transmission and an auto-cruise system. In the speed control system, a speed control pedal to be operated for speed control, a clutch lever for returning to a neutral position, and a speed-setting lever for setting a cruising speed are connected to an arm for rotating a speed control shaft of the continuously variable transmission through respective linkages. A mechanism is provided between the arm and the speed-setting lever. The mechanism allows operation of the clutch pedal while keeping a set speed by the speed-setting lever, and reproduces the set speed.

When a cruising speed is set and then the clutch pedal is depressed, the continuously variable transmission is returned to the neutral position so as to stop the traveling of the vehicle. Afterward, when the depressed clutch pedal is released, due to the above structure, the set cruising speed can be automatically reproduced. Thus, the cruising speed does not have to be set again after every depression of the clutch pedal, thereby improving operability. Further, when the vehicle resumes traveling, the last set cruising speed is surely reproduced so as to easily reenact the interrupted work, thereby obtaining even result of the agricultural work.

The mechanism for allowing operation of the clutch pedal comprises a rod, a stopper and a spring so as to have a simple structure, so that it can be produced inexpensively and can be easily assembled.

The speed-setting lever is disposed on a side of an operator's seat and is retained at any position in a lever guide, so as to be easily operated for setting a speed by an operator sitting on the seat.

<Structure of Tractor Concerned to Speed Control System>

A structure and the like of a tractor concerned to the speed control system will be described with reference to FIG. 13, however, description of the same as the above-mentioned structure referring to FIGS. 1 and 2 is omitted.

A pair of left and right steps 14 are disposed on left and right sides of a front portion of main body frame 2a. Speed control (or accelerator) pedal 21 adapted for selecting whether tractor 1 travels forward or backward is disposed above right step 14, and a clutch pedal 24 (see FIG. 14) adapted for temporarily cutting off the power transmission to traveling-drive wheels (front wheels 6 or rear wheels 7) is disposed above left step 14.

A pair of right and left brake (or clutch) pedals 22R and 22L adapted for braking respective left and right rear wheels 7 are juxtaposed forward from speed control pedal 21. Left rear wheel 7 is braked by depressing left pedal 22L, and right rear wheel 7 is braked by depressing right brake pedal 22R. Therefore, the tractor can turn sharply when steering wheel 11 is turned to a target side and simultaneously brake pedal 22 on the same side is depressed.

Brake pedals 22L and 22R and clutch pedal 24 are provided with respective (not shown) returning mechanisms (such as brake-returning springs) so as to be biased to respective release positions. Brake pedals 22L and 22R are provided with a connection mechanism so that both brake pedals 22L and 22R can be simultaneously operated for braking during on-road traveling or the like of the tractor.

The power of engine 8 is transmitted to continuously variable transmission 30 through a propeller shaft and universal joints (not shown), and into transmission casing 17. The transmission in transmission casing 17 comprises a gear train for transmitting power outputted from continuously variable transmission 30 to axles 18, so as to drive left and right rear wheels 7 through the pair of left and right axles 18 disposed in respective rear axle casings. In transmission casing 17, a differential unit (not shown) is disposed so as to differentially connect left and right axles 18 to each other, and a pair of brake devices (not shown) are disposed on respective left and right axles 18 and are connected to respective brake pedals 22L and 22R through respective rods or the like.

Continuously variable transmission 30 comprises a usual hydraulic system including a variable displacement hydraulic pump, a fixed (or variable) displacement hydraulic motor and a duct plate fluidly connecting the hydraulic pump and motor to each other. The hydraulic pump includes a pump shaft to which the power of engine 8 is transmitted. A speed control shaft 80 for tilt-operation of a movable swash plate of the hydraulic pump for changing the displacement of the hydraulic pump is supported by transmission casing 17, and projects outward from transmission casing 17 so as to be fixedly provided thereon with an arm 72. Arm 72 is connected to speed control pedal 21 and clutch pedal 24 through linkages disposed below steps 14.

In the tractor according to the present embodiment, an HMT serves as the continuously variable transmission, however, it is not to be limitative. Alternatively, an HST (hydrostatic stepless transmission) may serve as the continuously variable transmission. A forward/backward traveling direction switching system (not shown) is interposed between speed control shaft 80 and the movable swash plate, or between arm 72 and the linkage.

<Detailed Structure of Speed Control System>

A speed control system 71 will be described with reference to FIGS. 14 to 19. In each of FIGS. 14 to 17, an arrow is directed forward. For simplicity, brake pedal 22 and clutch pedal 24 are omitted in FIG. 16, and brake pedal 22 is omitted in FIG. 17.

Speed control system 71 includes arm 72 fixed on speed control shaft 80 of continuously variable transmission 30, speed control (or accelerator) pedal 21, clutch pedal 24, a speed-setting lever 74 and the respective linkages connecting arm 72 to speed control pedal 21, clutch pedal 24 and speed-setting lever 74.

Continuously variable transmission 30 is disposed adjacent to transmission casing 17. In this embodiment, continuously variable transmission 30 is disposed below operator's seat 13, however, this position is not limitative. Alternatively, continuously variable transmission 30 may be disposed adjacent to engine 8. Speed control shaft (such as a trunnion shaft) 80 is connected to the movable swash plate of the hydraulic pump of the HST serving as the continuously variable transmission, so that, by rotating speed control shaft 80, the delivery amount and direction of the hydraulic pump are changed so as to steplessly change a rotary speed of an output shaft of the hydraulic motor, thereby speed-changing the tractor. Arm 72 is fixed at one end thereof onto speed control shaft 80.

Referring to FIG. 15, in the present embodiment, with respect to rotational directions of arm 72, an arrow "a" designates a direction for deceleration (i.e., the direction for rotating the movable swash plate toward a neutral position so as to reduce the delivery amount of the hydraulic pump), and an arrow "b" designates a direction for acceleration (i.e., the direction for increasing the tilt angle of the movable swash plate so as to increase the delivery amount of the hydraulic pump).

While right and left steps 14 are extended between steering wheel 11 and operator's seat 13, speed control (or accelerator) pedal 21 is disposed on right step 14, and clutch pedal 24 is disposed on left step 14. Brake pedal 22 is disposed forwardly leftward adjacent to speed control pedal 21 on right step 14. Therefore, clutch pedal 24 is adapted to be depressed by a left foot, and speed control (accelerator) pedal 21 and brake pedal 22 are adapted to be depressed by a right foot, so that these pedals can be operated similarly to those of a passenger car.

Speed control pedal 21 includes a pedal arm 21a and a footplate 21b fixed on a tip of pedal arm 21a. Pedal arm 21a is fixed at a base end portion thereof onto one end of a pedal shaft 76 pivoted by main body frame 2a. An arm 50 is fixed on an intermediate portion of pedal shaft 76. A spring 86 and a damper 87 are pivoted at respective one ends thereof on a tip of arm 50, and are engaged at the respective other ends thereof to the vehicle body (main body frame 2a). Speed control pedal 21 is biased to its neutral position by spring 86, and is moderated by damper 87. In this regard, when speed control pedal 21 returns to the neutral position by the force of spring 86, damper 87 absorbs the force of spring 86 so as to prevent the vehicle from suddenly stopping.

An arm 51 is fixed on the other end of pedal shaft 76. A connection link 77 is pivoted on a tip of arm 51. Connection link 77 is pivoted at the other end thereof onto an intermediate portion of arm 72.

Clutch pedal 24 includes a pedal arm 24a and a footplate 24b fixed on a tip of pedal arm 24a. Pedal arm 24a is pivoted at a base end portion thereof onto a pedal shaft 75. Pedal arm 24a has a rearwardly downward extended arm portion having a tip onto which a connection link 78 is pivoted at one end thereof. Connection link 78 is pivoted at the other end thereof onto a lower end of arm 72.

Referring to FIG. 15, speed-setting lever 74 is disposed adjacent to operator's seat 13, especially in this embodiment, on a lateral side of operator's seat 13, so as to be rotatable in the fore-and-aft direction along a lever guide 52 and to be retainable at any position in lever guide 52. A projection 74b projects outward from a side surface of speed-setting lever 74 in correspondence to lever guide 52, and a guide slot of lever guide 52 is formed with notches 52a at certain intervals so as to correspond to projection 74b.

Due to this structure, speed-setting lever 74 having projection 74b disengaged from notches 52a is rotated to a target speed position, and then speed-setting lever 74 is laterally rotated so as to engage projection 74b into notch 52a, thereby being retained at the target speed position.

A mechanism for allowing rotation of clutch pedal 24 while keeping the set position of speed-setting lever 74 is interposed between speed-setting lever 74 and arm 72. This mechanism has a function for resuming the depression position of speed control pedal 21.

The mechanism for allowing rotation of speed-setting lever 74 includes a spring 81, a stopper 84 and a connection rod 85.

Speed-setting lever 74 is pivoted at a lower portion thereof onto a pivot shaft 83, and is pivoted at a lower end thereof onto one end of a connection link 53. Connection link 53 is pivoted at the other end thereof onto one end of a connection arm 54. Connection arm 54 has a connection pin 55 projecting from the one end thereof, and connection link 53 is formed in the other end thereof with a slot 53a, into which connection pin 55 is inserted so as to pivot connection link 53 on connection arm 54.

Connection arm 54 is pivoted at an intermediate portion thereof on a pivot shaft 90. Spring 81 and connection rod 85 are interposed between the other end of connection arm 54 and arm 72. Due to spring 81 interposed between connection arm 54 and arm 72, arm 72 is biased to rotate toward connection arm 54.

On the other hand, connection rod 85 is pivoted at one end thereof onto an end of connection arm 54, and is slidably inserted at the other end thereof into an engaging portion of arm 72. In this regard, arm 72 is provided with an engaging plate 72a projecting on an intermediate portion thereof by bending or welding. Engaging plate 72a has an insertion hole through which connection rod 85 is passed. Connection rod 85 is fixedly provided on an intermediate portion thereof with a stopper 84 adapted to contact engaging plate 72a. Stopper 84 may be retainably screwed on connection rod 85 adjustably in position.

Due to the above structure, unless the traveling speed is to be kept contact (i.e., during normal traveling), speed-setting lever 74 is disposed in a rotational range for low speed (rearward). In this state, if speed control pedal 21 is depressed for acceleration, depressed speed control pedal 21 rotates arm 72 through pedal shaft 76, arm 51 and connection link 77 so as to set continuously variable transmission 30 for acceleration. At this time, engaging plate 72a abuts against stopper 84 and pushes connection rod 85 so as to rotate connection arm 54. During this rotation of connection arm 54, connection pin 55 slides in slot 53a so as to prevent speed-setting lever 74 from rotating. Then, when depressed speed control pedal 21 is released for deceleration, arm 72 rotates in the opposite direction so as to set continuously variable transmission 30 for deceleration. In this regard, speed control pedal 21 is rotated in the direction for deceleration through arm 50a by the biasing force of spring 87, and simultaneously, connection arm 54 is rotated in the opposite direction by the biasing force of spring 81.

While the tractor is working or in another case, if the tractor is to travel at a constant speed, speed control pedal 21 is depressed to a degree for a target speed. When the increased traveling speed reaches the target speed, speed-setting lever 74 is rotated to a high speed range, and is retained by engaging with one notch 52a at a position corresponding to a speed up to the traveling speed. Afterward, even if depressed speed control pedal 21 is released, spring 81 keeps the retained position of speed-setting lever 74, and therefore, arm 72 is kept at the position so as to cruise the tractor.

To interrupt the work, when clutch pedal 24 is depressed, arm 72 is rotated to the neutral position through connection link 78 against the biasing force of spring 81 so as to stop the traveling of the tractor. Meanwhile, engaging plate 72a slides along connection rod 85. In this way, clutch pedal 24 is allowed to be depressed while speed-setting lever 74 is kept at the set position.

To resume the work, when the depression of clutch pedal 24 is canceled, arm 72 rotates for acceleration by the force of spring 81 till engaging plate 72a comes to abut against stopper 84. In this way, the traveling speed becomes the speed set by speed-setting lever 74 again, i.e., the last set speed is reproduced.

Incidentally, a slot 25 is provided in a portion of connection link 78 connected to pedal arm 24a. Due to slot 25, when clutch pedal 24 is depressed while arm 72 is disposed at the neutral position, connection pin 26 connecting both members 24a and 78 to each other merely slides in slot 25 in correspondence to the depression of clutch pedal 24 so as to prevent arm 72 from rotating from the neutral position. When clutch pedal 24 is depressed while arm 72 is tilted from the neutral position, connection pin 26 pushes connection link 78 at an end of slot 25 so as to return arm 72 to the neutral position. If speed control pedal 21 is depressed during the cruising, arm 72 can be rotated for acceleration.

Due to the present vehicle speed control, when once a speed is set by speed-setting lever 74, the speed got by speed control pedal 21 is kept after returning clutch pedal 24 even if the speed is reduced by depressing clutch pedal 74. In this way, the speed got by speed control pedal 21 has reproducibility.

Further, in the state where a speed is set by speed-setting lever 74, brake pedal 22 can also be depressed so as to rotate arm 72 toward the neutral position against spring 81. In this way, while a speed is set by speed-setting lever 74, brake pedal 22 is allowed to be depressed, and if depressed brake pedal 22 is released, the set speed is reproduced similar to that by returning clutch pedal 24.

Incidentally, speed-setting lever 74 can be operated for selecting whether the vehicle travels forward or backward.

What is claimed is:

1. An assist grip of a tractor, for being disposed on a dashboard in front of a steering wheel and supporting a weight of a driver riding on/off an operation section of the tractor, the assist grip comprising:

an arched member having a substantially vertically reversed U-shape when viewed in front, wherein the arched member has an upper portion formed in an arch-shape that forms a concentric ring arrangement with the steering wheel when viewed in plan, and is spaced from the steering wheel.

2. The assist grip of claim 1, wherein the arched member has a substantially rectangular sectional shape.

3. The assist grip of claim 1, wherein the arched member is made of resin material.

4. The assist grip of claim 1, wherein the arched member has a horizontally extended portion and two upwardly extended portions, wherein the horizontally extended portion of the arch member has a thickness narrower than that of the upwardly extended portions.

5. The assist grip of claim 1, wherein a slant angle of the arched member corresponds to a slant angle of an instrument panel provided on the dashboard.

\* \* \* \* \*